Oct. 1, 1957  J. H. McLEOD  2,807,982
LENS CENTERING CLAMP AND TESTING DEVICE
Filed Jan. 2, 1953  2 Sheets-Sheet 1

John H. McLeod
INVENTOR.

BY

ATTORNEY & AGENT

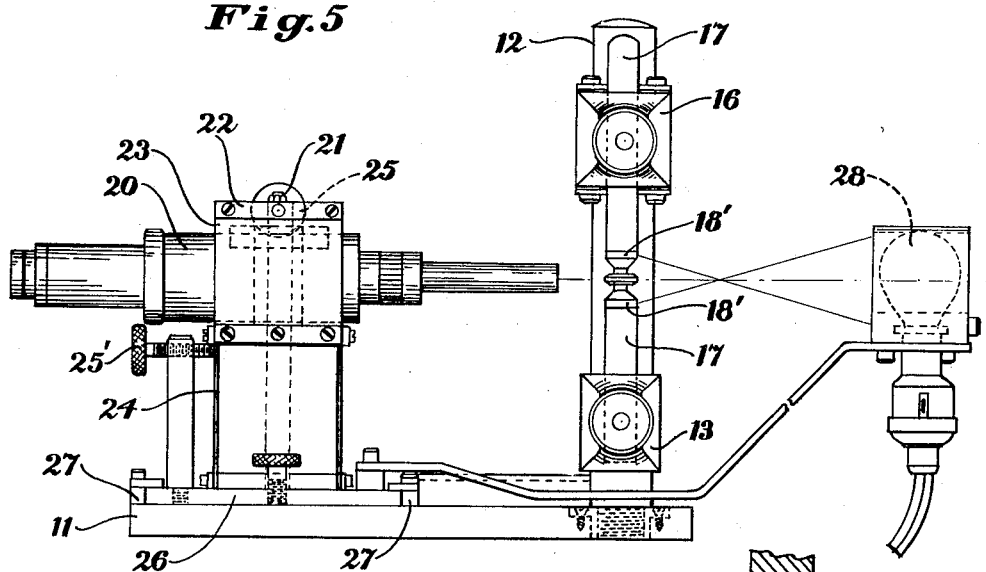
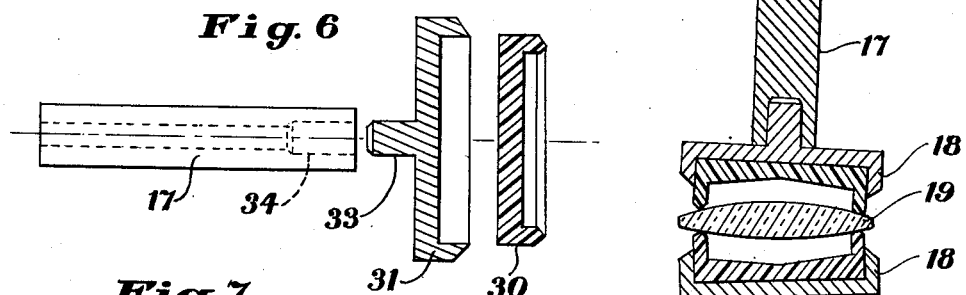
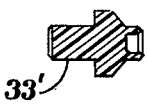
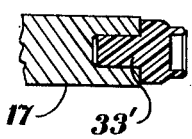
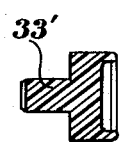
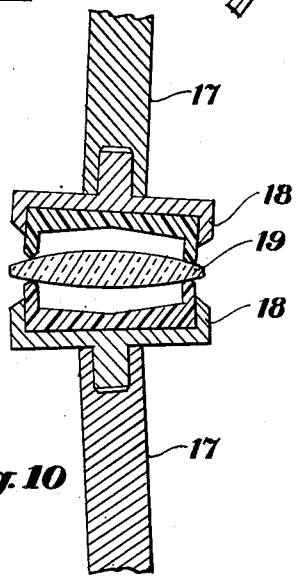

2,807,982

LENS CENTERING CLAMP AND TESTING DEVICE

John H. McLeod, Rochester, N. Y., assignor to Eastman Kodak Company, Rochester, N. Y., a corporation of New Jersey Application January 2, 1953, Serial No. 329,271

6 Claims. (Cl. 88—57)

This invention relates to a lens centering device and method and has as its principal object the provision of an easy method and inexpensive apparatus for centering lens elements for testing the accuracy with which the edges have been ground.

It is also an object of the invention to provide apparatus in which lenses can be centered which have shallower curves than necessary for centering on previously known apparatus.

It is a specific object of the invention to provide lens centering rings in which the lens elements can be rotated with less danger of scratching than in the apparatus known heretofore. That is, with the present invention the lens element is rotated while clamped between stationary cups whereas no such rotation was feasible with prior systems. Also since the clamps are stationary, all need for accurate bearings is eliminated. The net result is that a lens eccentricity tester using the present invention is more precise than prior instruments and costs only one eighth as much.

The invention in the specific form described herein is an improvement over the apparatus shown diagrammatically in Fig. 10 of Patent No. 2,259,006, Simmons, issued October 14, 1941. In the apparatus there shown, a lens element is clamped between two steel clamping jaws with ring-shaped faces and, by sliding on the faces of the jaws, the lens assumes a centered position. A microscope is focused tangentially on the edge of the lens, the upper jaw is withdrawn and the lower jaw is rotated, whereupon any lack of centering of the edge of the lens is observed as a movement back and forth across the field of view of the microscope during one complete revolution of the lens. The eccentricity is measured by measuring this movement. In practice, it has been found necessary to mount the two clamping members very accurately so that the rings which center the lens element are accurately coaxial with the axis of rotation of the lower clamping member. Any error in centering the rings gives a false indication of decentering of the lens element. Also, it has been found important in the prior art to make the lower bearing very accurate, thus involving considerable expense, since any weaving back and forth of the lower clamping member during rotation would also give a false indication. The present invention eliminates the need for these bearings completely.

According to the present invention, a lens centering apparatus is made up for clamping a lens element between a pair of ring-shaped clamping members having a coefficient of friction against glass of less than 0.03. The rings are pressed against the lens element and held stationary against sliding or rotational movement and the lens is rotated by sliding upon the faces of the clamp.

I have discovered that when the clamping rings are made of a material having a coefficient of friction less than 0.03 that the lens is easily rotated while clamped firmly between the rings, whereas the friction in a pair of steel clamping rings is sufficient to prevent rotation of the lens, as was stated in the Simmons patent. It may be noted that the accepted value of the coefficient of friction for steel on agate (generally assumed to be substantially the same as that for steel on glass) is 0.20 and that the lowest coefficient of friction given in the "Physics and Chemistry Handbook" is 0.03 to 0.036 for "smooth surfaces, best results." I have also discovered that lenses with only a 3° edge prism angle can be centered in the low-friction cups according to the invention, whereas in practice, lenses could only be centered satisfactorily in the previously used steel cups when the edge prism angle is about 10 or 11° or more.

A plastic material described in U. S. 2,230,654 Plunkett and known as "Teflon," which is polytetrafluoroethylene, has been found to have an extremely low coefficient of friction on glass of about 0.02.

One specific embodiment of the invention will now be described with reference to the accompanying drawings in which:

Fig. 5 is an elevational view of the apparatus,

Fig. 6 is an exploded view partly in axial section of one of the clamping members, Fig. 7 is a sectional view of a facing ring of small diameter, Fig. 8 is a sectional view of a facing ring of small diameter fitted on to a support rod, Fig. 9 is a sectional view of a facing ring of moderate diameter, Fig. 10 is a diagram in sectional view of a pair of poorly aligned clamping members illustrating one advantage of the invention.

Figure 1:
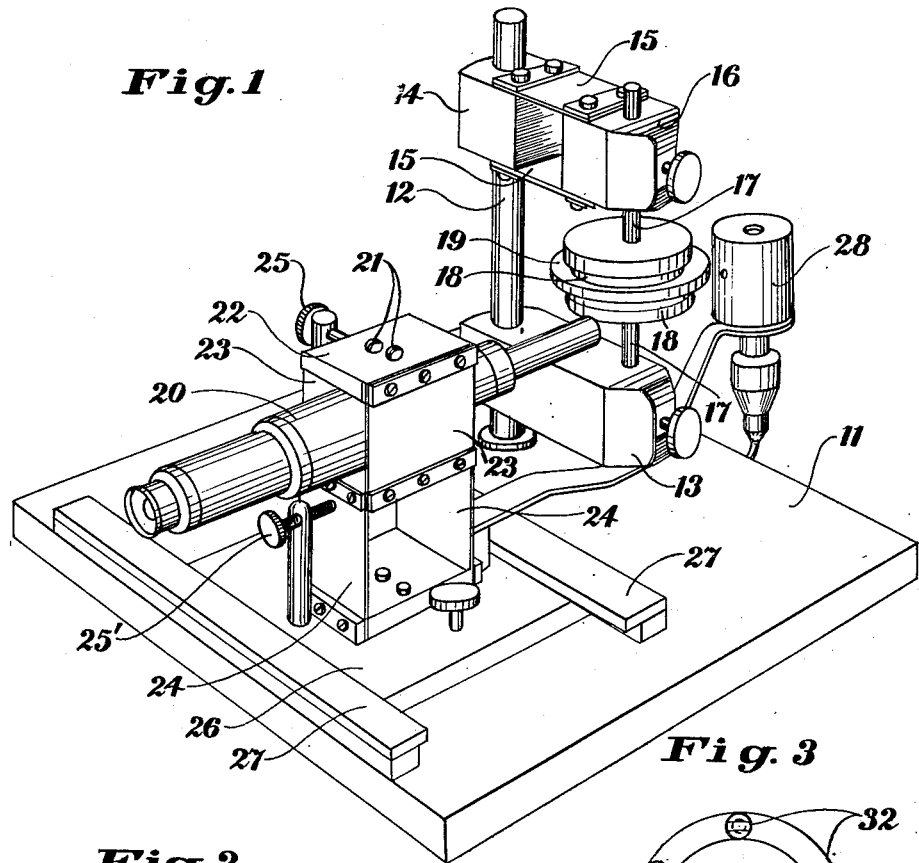
Fig. 1 is a perspective view of the apparatus.

In Fig. 1 a solid post 12 is firmly mounted on a table top 11 and the two jaws 13, 14 of the clamp are secured to the post 12 by thumb screws. The lower jaw 13 is of solid construction but the upper jaw 14 carries a pair of sheet springs or flexure members 15 which in turn carry the block 16 forming the tip of the upper jaw of the clamp. Interchangeable facing members for the jaws of the clamp are provided in the form of cups or rings mounted on the ends of support rods 17, and these support rods are inserted in the jaws of the clamp as shown in Fig. 1 and fastened by thumb screws. For illustration, a pair of rings 18 of comparatively large diameter are shown in Fig. 1 supporting a lense 19 of large diameter.

For observing the edge of the lens while it is being rotated, a microscope 20 is provided which is mounted by screws 21 on a block or cradle 22 which in turn is mounted on a pair of flexure plates 23 adjusted by thumb screw 25 for lateral adjustment of the microscope, and this pair of flexure plates 23 are in turn mounted on a second pair of flexure plates 24 at right angles thereto, adjusted by thumb screw 25' for focusing movement of the microscope. The whole microscope apparatus is mounted on a block 26 which slides laterally in ways 27 for rough lateral adjustment of the microscope position. Attached to the block 26 so that it moves with the microscope is a lamp 28 which is thus kept in the same position relative to the microscope when the microscope is moved for observing lens elements of different sizes.

Figure 2:
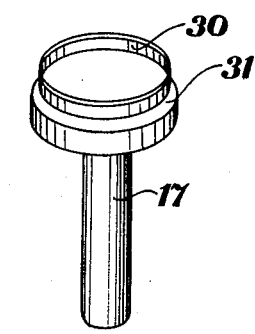
Fig. 2 is a perspective view of a clamping ring member

The clamping members according to the invention are faced with a plastic ring 30 as shown in Fig. 2 mounted on a circular metal plate 31 for rigid support which is in turn mounted on the rod 17. The plastic ring and metal backing together make up the facing member 18 of Fig. 1.

Figure 3:
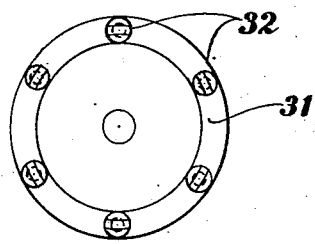
Fig. 3 is a face view of a clamping member with a discontinuous ring face.
Figure 4:
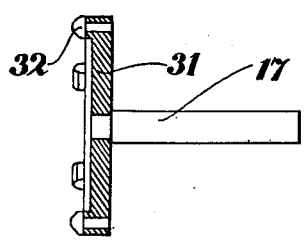
Fig. 4 is a side view partly in axial section of Fig. 3.

Figs. 2, 3, 4, 6, 7, 8, and 9 show various suitable constructions for clamping rings of various sizes. Fig. 2 is a general schematic view already mentioned. Fig. 3 shows a variation in which the plastic ring is not continuous but is made up of plastic posts 32 set into the metal plate 31 which in turn is mounted on the rod 17 as in Fig. 4. Fig. 4 is a sectional view of the metal plate and plastic posts of Fig. 3. The posts 32 are conveniently set into holes through the metal plate as shown.

Fig. 6 is an exploded sectional view of a clamping ring similar to that shown in Fig. 2. A plastic ring 30 is conveniently made in the form of a cup which fits inside the metal cup 31 which in turn has a short stem at the center 33 which goes into a recess 34 in the rod 17, fitting with a press fit. Figs. 7, 8, and 9 show three plastic rings of small diameter in which the entire clamping ring is made of plastic with the stem 33' which fits into the support rod 17 as shown in Fig. 8.

Fig. 5 corresponds to Fig. 1 and shows an elevation view of the apparatus. There is only a slight difference in that a pair of small diameter clamping rings 18' are shown in operative position instead of a pair of large diameter rings as in Fig. 1, thus illustrating that these rings are interchangeable.

Fig. 10 is a diagrammatic view in axial section of a lens element 19 clamped between a pair of relatively uncentered clamping rings 18. By "relatively uncentered" as used here and in the claims is meant that no means are provided for accurately centering and aligning the clamping rings relative to each other. Of course it may happen by chance that some pairs of rings are sometimes in alignment when clamping certain lenses, but this is of no significance because such alignment is not relied upon. It has already been stated that one of the important advantages of the present invention is that the axes of the two clamping rings do not need to be accurately aligned. In order to bring out this advantage, Fig. 10 has been drawn with greatly exaggerated errors of alignment of the two clamping rings. The two axes as shown intersect at a point below the lens element 19. Nevertheless, when the face of the clamping ring is made up of a plastic having a coefficient of friction against glass of less than 0.03, I have found that the lens can be revolved in the clamp by slipping on the faces of the clamping rings and the axis of the lens will be maintained stationary during rotation even though it does not coincide with the axis of either ring. The greater simplicity of construction is readily apparent as compared with making accurately aligned bearings, and has been found to effect a saving of more than 80 percent in the cost of the equipment. Moreover, it has been found that much weaker lenses can be centered in the low friction cups than in steel cups and that actually the angle between the tangents to the lens surface at the points of contact with the clamping rings can be as small as 3° compared with 10 or 11° for steel cups giving comparable accuracy of centering.

Another important advantage of the invention is that the plastic is softer than steel and has almost no tendency to scratch the glass. In fact, it has been found that lenses with evaporated interference coatings deposited on their surfaces for modifying the reflective properties can in many cases be centered in these cups without noticeable scratching, whereas this was impossible with the steel cups.

A still further advantage of the invention is that the plastic cups even if scratched or dented accidentally in handling are easily repaired by rubbing down the rough spot or shaving it off slightly with a sharp knife. The ring does not have to be maintained in absolute accuracy or exact roundness and in fact, the discontinuous ring shown in Fig. 3 works satisfactorily even if only three alternate posts of the clamping face actually touch the lens.

The use of flexure plates 23, 24 in mounting the microscope provides a very inexpensive and satisfactory method of mounting the microscope for fine adjustment. The flexure plates 15 forming part of the upper jaw of the clamp are preferably made of heavier material so that they provide a suitable degree of pressure between the faces of the clamp as can quickly be determined in practince, and at the stame time they provide a quick method of opening the jaws of the clamp to insert and remove a lens element.

I claim:
1. A device for centering a lens element whose refracting surfaces are coaxial surfaces of revolution, comprising two opposing members for clamping opposite faces of the lens, each member being adapted to contact the lens surface in at least three points spaced apart substantially in a circle surrounding the optic axis and means for holding the clamping members free from rotation and in a clamping position against the lens, characterized by the lens-contacting portions of the clamping members being relatively uncentered and being made of a material having a coefficeint of friction against glass of a value between 0.03 and zero, whereby the lens element is readily rotatable in the clamp while the optic axis of the lens element is maintained in a fixed position.

2. A device according to claim 1 in which one clamping member is held in a fixed position and the other clamping member is spring-urged toward the fixed member by springs having sufficient flexure to allow easy removing and inserting of lens elements.

3. The method of measuring the accuracy of centering of the periphery of a lens element whose refracting faces are coaxial surfaces of revolution, which comprises clamping the lens element by its refracting faces between two relatively uncentered and non-rotatable clamping members adapted to touch the lens only in a ring-shaped area around the axis and made of a material having a coefficient of friction against glass of a value between 0.03 and zero, applying torque to the lens element sufficient to rotate it relative to the clamping members by sliding thereon, and measuring radially with respect to the axis the positions of successive points of the periphery of the lens as they pass a fixed point.

4. The method of measuring the accuracy of centering of the periphery of a lens element whose refracting faces are coaxial surfaces of revolution, which comprises clamping the lens element by its refracting faces between two relatively uncentered non-rotatable clamping members adapted to touch the lens only in a ring-shaped area around the axis, applying torque to the lens element sufficient to rotate it relative to the clamping members by sliding thereon, and measuring radially with respect to the axis the positions of successive points of the periphery of the lens as they pass a fixed point.

5. A device for measuring the accuracy of centering of the periphery of a lens element whose refracting surfaces are coaxial surfaces of revolution, comprising a clamp for holding the lens element, measuring means for making comparative measurements of the semidiameter of the lens and support means for holding said clamp and said measuring means in operative relationship to each other, in which the said clamp comprises two opposing clamping members spring urged toward each other and each adapted and relatively positioned to contact the lens element at at least three points spaced around the axis thereof, characterized by said support means being adapted to hold said clamp in a fixed position relative to said measuring means, by said clamping members being relatively uncentered and by the lens-contacting portions of said clamping members being made of a material having a coefficient of friction against glass of a value between 0.03 and zero, whereby the lens element is readily rotatable in said clamp and the axis of the lens element is maintained in a fixed position for measuring the semidiameter of the lens element at several points on its periphery relative to one another.

6. A device as claimed in claim 5 in which the said lens-contacting portions are made of polytetrafluorethylene.

(References on following page)

References Cited in the file of this patent

UNITED STATES PATENTS

| | | |
|---|---|---|
| 1,241,612 | Emerson | Oct. 2, 1917 |
| 1,984,121 | Drescher | Dec. 11, 1934 |
| 2,042,565 | Tillyer | June 2, 1936 |
| 2,166,037 | Campos | July 11, 1939 |
| 2,230,654 | Plunkett | Feb. 4, 1941 |
| 2,240,827 | Bangert et al. | May 6, 1941 |
| 2,245,257 | Crumrine | June 10, 1941 |
| 2,259,006 | Simmons | Oct. 14, 1941 |
| 2,352,179 | Bolsey | June 27, 1944 |
| 2,388,893 | Wood | Nov. 13, 1945 |
| 2,394,721 | Simmons et al. | Feb. 12, 1946 |

OTHER REFERENCES

"Modern Plastics," Bulletin of E. I. Dupont De Nemours & Co., Inc., Wilmington, Delaware, June 1946, pages 134, 135.

"Plastics Bulletin," vol. 12, No. 46, 1950, pages 183–186, published by The Polychemicals Dept. of E. I. du Pont de Nemours & Company, Inc., Wilmington, Delaware.